United States Patent [19]

Lippmann et al.

[11] Patent Number: 5,233,329
[45] Date of Patent: Aug. 3, 1993

[54] FILTER WITH HYSTERESIS FOR TRIP POINT APPLICATIONS

[75] Inventors: Raymond Lippmann, Ann Arbor; James E. Nelson, Union Lake; Michael J. Schnars, Clarkston; James R. Chintyan, Davison, all of Mich.; James M. Aralis, Mission Viejo; Frank J. Bohac, Jr., Laguna Hills, both of Calif.; Anthony L. Simon, Southfield, Mich.

[73] Assignees: Delco Electronics Corporation, Kokomo, Ind.; Hughes Aircraft Company, Los Angeles, Calif.; General Motors Corp., Detroit, Mich.

[21] Appl. No.: 750,083

[22] Filed: Aug. 27, 1991

[51] Int. Cl.⁵ .................... B60Q 1/00; G01F 23/30
[52] U.S. Cl. .................... 340/438; 340/501; 340/511; 340/661; 73/308; 73/304 R
[58] Field of Search ............ 340/438, 500, 501, 506, 340/507, 511, 526, 529, 428, 449–450.3, 459, 612, 618, 620, 623–625, 870.04, 661, 657; 330/9, 280, 281; 328/162; 73/308, 304 R, 307, 304 C, 290 R

[56] References Cited

U.S. PATENT DOCUMENTS

| | | | |
|---|---|---|---|
| 4,246,572 | 1/1981 | Larsen | 340/501 |
| 4,250,750 | 2/1981 | Martinec et al. | 73/308 |
| 4,263,583 | 4/1981 | Wyckoff | 340/501 |
| 4,614,114 | 9/1986 | Matsumoto et al. | 73/313 |
| 4,635,043 | 1/1987 | Kronenberg et al. | 340/618 |
| 4,757,303 | 7/1988 | Scheidweiler | 340/501 |
| 4,760,736 | 8/1988 | Huynh | 73/430 |
| 4,768,377 | 9/1988 | Habelmann et al. | 73/313 |

Primary Examiner—Donnie L. Crosland
Attorney, Agent, or Firm—Anthony Luke Simon

[57] ABSTRACT

A circuit including a sender providing a sender output signal responsive to a vehicle parameter, circuitry for providing an adjustable reference, circuitry for comparing the output signal to the adjustable reference and providing a comparison output signal therefrom, an up/down counter for filtering the comparison output signal, and circuitry for providing an indicator control signal in response to the filtered output signal and for controlling the adjustment of the adjustable reference, provides a signal to a vehicle operator that is both filtered and has hysteresis to minimize repeated switching of the signal between two states.

37 Claims, 7 Drawing Sheets

FILTER WITH HYSTERESIS FOR TRIP POINT APPLICATIONS

The subject of this application is related to copending application entitled "Circuit With Ratiometric Analog Inputs," filed concurrently with this application, assigned to the assignee of this application, and incorporated herein by reference.

This invention relates to vehicle apparatus that indicate conditions of vehicle parameters and more particularly to circuitry suitable for integration that may be used to control a telltale in a manner that prevents repeated turn on and off of the telltale when a particular vehicle parameter is near a trip point.

BACKGROUND OF THE INVENTION

Typically, motor vehicles contain numerous senders that sense various vehicle parameters. In response to the output of the senders, circuitry within the vehicle selectively operates telltales indicating warnings or other conditions pertaining to particular vehicle parameters.

Sender data tends to be somewhat erratic, varying with acceleration and attitude of the vehicle. As a result, it is preferable to process the sender data before it is used to drive a telltale. The processing of the sender data includes filtering to avoid the affects of rapid signal fluctuations caused by vehicle accelerations.

Filtering the sender data to eliminate signal fluctuations may require a filter with a very long time constant, even exceeding hundreds of seconds. The discrete components used in typical filters may be quite large to the point of impracticality or, in the event of a microprocessor implementation, expensive.

What is desired is an apparatus for processing sender data and controlling telltales in response to the sender data that does not have large discrete components, or require the expense of a microprocessor.

SUMMARY OF THE PRESENT INVENTION

The present invention provides circuitry suitable for integration that can process sender data through a long time constant filter and provide hysteresis to the output. The filtering is preferably accomplished with an up/down counter with overflow and underflow outputs. The hysteresis is accomplished by altering a comparison reference level in response to an output control signal. The hysteresis prevents haphazard turn on and turn off of the telltale when the vehicle parameter is near the trip point. The circuit of this invention is suitable for integration so that several circuits of this invention may be placed in a single integrated circuit, saving space over convention discrete component circuits and saving expense over both microprocessors and conventional discrete component circuits. Additionally, this invention allows filter time constants and hysteresis values to be easily set on the IC, permitting the function of the IC to be tuned for each specific application with simple IC masking and without proliferating part numbers.

Structurally this invention includes a sender responsive to a measurement of a vehicle parameter and means for providing first and second reference signals alternately selected in response to a control signal, the first reference signal selected if the control signal is a first signal condition and the second reference signal selected if the control signal is a second signal condition, the first reference signal being higher than the second reference signal. The selected reference signal is compared to the sender output signal and the result is filtered. A control signal is provided in response to the filtered signal, the control signal comprising the first signal condition if the sender output signal is below the selected reference signal for a predetermined number of clock pulses and the control signal comprising the second signal condition if the sender output signal is above the selected reference signal for a predetermined period, whereby the control signal is filtered and has hysteresis minimizing repeated switching of the control signal between the first and second signal conditions when the parameter measurement is near a trip point. A means alerts the vehicle operator in response to the control signal.

DETAILED DESCRIPTION OF THE INVENTION

Figure 1:
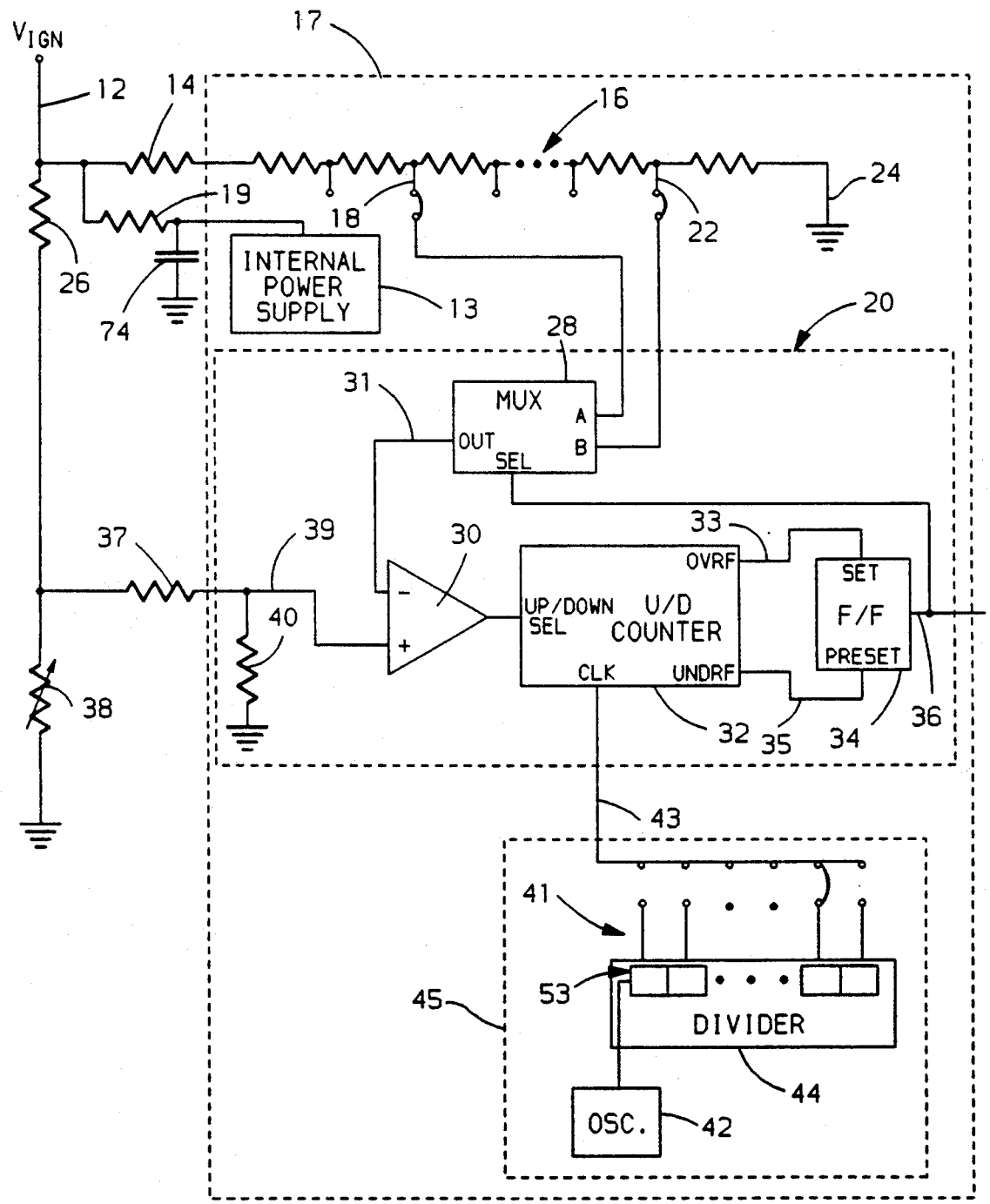
FIG. 1 is a schematic diagram of the circuit of this invention.

Referring to FIG. 1, components of this invention which may be implemented onto an integrated circuit 17 include resistor chain 16, internal power supply 13, filter circuit 20, and clock circuit 45. Resistors 14, 19, 26 and 37, capacitor 74 and sender 38 are components external to integrated circuit 17.

Line 12 represents the vehicle ignition voltage, Vign, where power is about 13 volts is provided when the vehicle ignition is switched on and zero volts are provided when the vehicle ignition is switched off. The vehicle ignition voltage in line 12 is provided to the integrated circuit 17 via resistors 14 and 19. Resistor 14 and resistor a voltage divider providing a step down in the voltage in line 12, protecting the integrated circuit 17. Likewise, resistor 19 is a load resistor coupled to the internal power supply 13, protecting the integrated circuit 17 from the voltage on line 12.

Load resistor 26, through division with the sender 38, provides the bias to sender 38. Sender 38 is a variable resistance sensor of the type used to measure any vehicle parameter which can be measured through a variable resistance sensor. For example, the sender 38 may be a fluid level sensor whose output impedance is a function of fluid level, or may be a thermistor whose output impedance is a function of temperature, or may be a pressure transducer whose output impedance is a function of pressure. A typical use of the sender 38 is to detect a warning condition to which corresponds an ascertainable sender output impedance, a trip point.

The sender output impedance is coupled to the input line 39 of filter circuit 20 through a resistor divider comprising external resistor 37 and internal resistor 40. Resistors 37 and 40 are set up such that the extreme anticipated voltages at line 39 are less than the voltage Vs supplied by the internal power supply 13. The voltage divider comprising resistors 37 and 40 preferably has a large impedance relative to the resistance of sender 38, to minimize the affect of the current through resistors 37 and 40 on the voltage at the output of sender 38. A large resistance for resistor 37 provides transient protection for the integrated circuit 17 by limiting the current line 39 of integrated circuit 17.

In prior art applications of ratiometric inputs, resistor 40 is an external resistor because precise resistances are hard to fabricate on integrated circuits. If resistor 40 is not precisely known, the division ratio of resistor 40 with resistor 37 is not precisely known, and may drift with temperature changes relative to resistance at the taps 18, 22 of resistor chain 16.

According to copending patent application, the ratiometric operation of the integrated circuit 17 can be maintained with resistor 40 fabricated onto integrated circuit 17 if: (i) resistors 14 and 37 are large enough to protect integrated circuit 17 from transients and resistors 37 and 40 are large enough to prevent excessive loading of sender 38, e.g. $R_{38}$, $R_{26} << (R_{37}+R_{40})$; (ii) resistor 40 and the total resistance of resistor chain 16 are selected such that their maximum anticipated resistances, in combination with $R_{14}$ and $R_{37}$, limit the voltage levels at the inputs of comparator 30 to less than the supply voltage Vs provided by internal power supply 13; (iii) $R_{14}=R_{37}$; and (iv) $R_{40}$=the total impedance of resistor chain 16.

Identical resistors can be made to track well over temperature as long as they are both located either on integrated circuit 17 (resistors 40 and resistor chain 16) or off integrated circuit 17 (resistors 14 and 37). If the above conditions are met, the circuit is insensitive to the differences in temperature coefficient of resistance between the resistors located on integrated circuit 17 and the resistors external to integrated circuit 17. If the above conditions are met, it can be further shown that $V_{line39}/V_{line31}$ is proportional to $R_{38}/(R_{26}+R_{38})$. As can be seen, when the above conditions are met, the voltages at the input of comparator 30 are completely independent of the resistances of resistor 40 and resistor chain 16, maintaining the ratiometric relationship of lines 39 and 31 with respect to resistors 26 and 38.

The signal on line 39 is connected to the non-inverting input of comparator 30. The inverting input of comparator 30 is connected to an adjustable reference source, comprising multiplexer 28 and resistor chain 16.

The resistor chain 16 is a plurality of resistors connected in parallel with taps located at each resistor junction. Resistor chain 16 is used to generate the desired reference voltages because it is not difficult to produce, in an integrated circuit, resistances which precisely track one another in ratio as temperature changes. However, it is difficult to produce in an integrated circuit repeatable discrete resistance values and resistances which are highly stable over varying temperature ranges.

Preferably the resistor chain 16 contains 128 resistors with tap points between them. Two tap point are connected to the two inputs of multiplexer 28 as specified by a metal mask in the integrated circuit 17. Here first and second tap points 18 and 22, providing first and second reference voltages, are connected to the A and B inputs of the multiplexer 28. The multiplexer 28 is selectively adjusted between the A and B inputs in response to the control signal on line 36.

Figure 2:
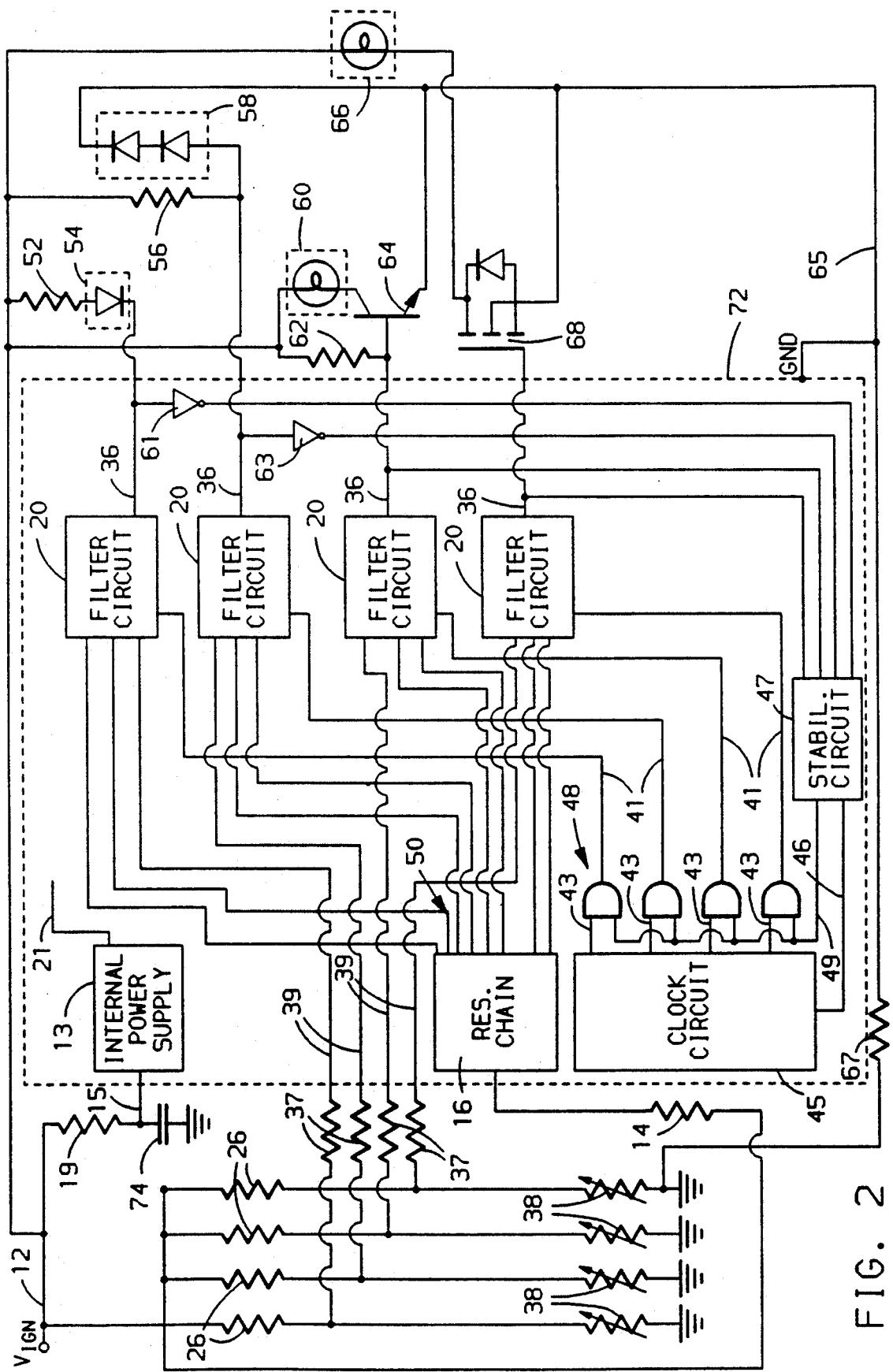
FIG. 2 is a schematic diagram of an example IC implementation of this invention driving four different types of telltales.

At initialization, flip flop 34 is reset so that the control signal on line 36 input to multiplexes 28 is low. The low logic signal on line 36 controls multiplexer 28 so that the signal on input A is couples to the output line 31 of multiplexer 28. This couples tap point 18 to the inverting input of comparator 30. With this arrangement, input A of the multiplexer, which is connected to tap point 18, is selected to match the voltage level on line 39 corresponding to a desired condition (and corresponding to the desired trip point) of the output of sender 38. This is true if the sender is connected so that the voltage on line 39 increases as the trip point is approached. In the event that the opposite is true, an inverter (not shown) is connected between line 36 and a display (example displays are shown in FIG. 2) and tap point 22 is set to correspond to the trip point.

During operation of the vehicle, the signal being measured, the sender data coupled to line 39, varies with variance of the parameter measured by the sender 38, and may vary with the motion or other characteristics of the vehicle. The comparison output signal, output from comparator 30, is either high or low and reflects whether the sender data is above or below the reference voltage on line 31. As the sender data fluctuates, the comparator output may in turn fluctuate if the sender data varies both above and below the reference voltage on line 31.

Up/down counter 32 is used as a filter means to dampen the fluctuations at the output of the comparator. Up/down counter 32 comprises a number of binary counting stages, the number of which, in part, determines the amount of damping on the output of comparator 30. The up/down counter has a clock input which receives a clock signal from clock circuit 45 on line 43.

Clock circuit 45 may comprise oscillator 42 and divider 44. Oscillator 42 provides a high frequency clock pulse that is input to divider 44. Divider 44 comprises a series of flip/flops 53 coupled in succession. Each flip/flop 53 divides the frequency of the signal at its input in half. The outputs of the flip/flops 53 are connected to terminals 41, each terminal 41 having a clock signal ½ the frequency of the preceding terminal 41. The frequency of the clock signal on line 43 is set during manufacture by a metal mask option in the integrated circuit 17 coupling one of the terminals 41 to line 43.

The output of the comparator 30 is connected to the up/down select input of up/down counter 32, determining whether the counter 32 clocks up or clocks down with every clock pulse on line 43. The overflow and underflow outputs of the counter 32 are fed, via lines 33 and 35, to the set and preset inputs of flip/flop 34, respectively. The output of flip/flop 34 is the control signal on line 36, which is high whenever an overflow from counter 32 is detected, and low whenever an underflow is detected (the first and second signal conditions of the control signal).

The up/down counter 32 tends to filter out high frequency fluctuations in the sender output that are coupled to the output of comparator 30. For example, a few counts in the upward direction followed by a few counts in the downward direction will not cause an overflow or underflow, and therefore will not change the output of the flip/flop 34. With this circuit arrangement, damping of the fluctuations in the comparator output is achieved in relation to the frequency of the oscillator 42 and the terminal 41 of divider 44 to which line 43 is coupled. The filter function of the up/down counter 32 is only concerned with parameter fluctuations which occur when the sender output is near the reference levels set by the taps 18 and 22 in the resistor chain. This is because, if the sender output is significantly higher or lower than the reference input to comparator 30, the output of comparator 30 does not change with parameter fluctuations, maintaining the up/down select of up/down counter 32 constant.

Hysteresis in the control signal on line 36 is achieved by coupling the control input of the multiplexer 28 to line 36. The circuit starts out with an underflow condition and a low logic signal on line 36. The low logic condition on line 36 couples the tap 18 to the comparator 30. When the signal data from sender 38 is of sufficient level for enough counts of the clock line 43, up/down counter 32 overflows, toggling the flip/flop 34. When up/down counter 32 overflows, the control signal at the output of flip/flop 34 goes high.

The high logic level signal on line 36, toggles multiplexer 28 so that the lower reference voltage level at tap 22 is coupled to line 31, the output of multiplexer 28. With the inverting input of comparator 30 coupled to a reference voltage that is lower than the reference voltage at tap 18, the input signal on line 39 must be lower than a signal (e.g., at tap 22) that is lower than the first reference (tap 18), to clock down up/down counter 32. Hence there is hysteresis in the circuit in a first direction.

When the signal on line 39 is lower than the reference at tap 22, the comparator output 30 is low, selecting up/down counter 32 to count down with every clock pulse on line 43. When up/down counter 32 underflows, a signal on line 35 resets flip/flop 34, bringing the control signal on line 36 low. When the control signal on line 36 goes low, the inverting input of comparator 30 is again coupled to the first reference signal at tap 18, providing hysteresis in the circuit in the second direction.

This application of hysteresis to the circuit minimizes on-off toggling of the output 36 which would occur with sender output fluctuations if only one reference was supplied to the comparator 30. The output 36 is used to control the switch on and switch off of a display telltale in an improved aesthetically pleasing manner, since it greatly reduces haphazard on and off flashing of the telltale when the measured parameter is near the warning level.

The above circuit is sufficiently small that four circuits may be fabricated onto a single integrated circuit package, all four circuits being connected to a common internal power supply, to taps in a common clock circuit, and to taps in a common resistor chain. This arrangement provides significant cost savings over conventional telltale drive techniques.

Referring to FIG. 2, four filter circuits 20 are integrated into a single integrated circuit package 72. The four filter circuits 20 all receive power from internal power supply 13, are all tapped into internal resistor chain 16 (not necessarily at the same places) through lines 50 and are all coupled to clock circuit 45 through lines 43 and 41 (again all are not necessarily coupled to the same frequency outputs of divider 44). The power supply line 15 is coupled to ground with capacitor 74 to help filter out supply line noise and power spikes.

Four senders 38 are connected with associated load resistors 26 in the manner described with reference to FIG. 1 and provide four signals of four different vehicle parameters (or possibly redundant signals of an important parameter) to the IC package 72 via resistors 37. Each sender output signal is coupled to a different circuit 20 as shown. The control signal outputs of the circuits 20, on lines 36, are fed to four different telltale circuit implementations.

The first telltale example includes LED telltale 54. LED telltale 54 is connected in series with resistor 52 and coupled between the ignition supply line 12 and line 36. Line 36 is connected to an open drain driver at the output of flip/flop 34. Telltale 54 emits light when line 36 is pulled low.

The second telltale example includes stacked LED telltale 58, including two LEDs serially connected between line 36 and ground line 65. Stacked LED telltale 58 is suitable for use in larger area or brighter telltale implementations. Resistor 56 holds line 36, also connected to an open drain driver, high, so that telltale 58 emits light. When line 36 is pulled low, telltale 58 ceases to emit light.

The third telltale example includes incandescent lamp telltale 60, controlled by transistor 64. Resistor 62 normally holds the base of transistor 64 high (here also line 36 is connected to an open drain driver), so that transistor 64 conducts current. When transistor 64 conducts current, incandescent lamp 60 emits light. When the output signal on line 36 is pulled low, the base of the transistor 64 is held low, preventing current from flowing through transistor 64 and lamp telltale 60, whereby the lamp telltale 60 does not emit light.

The fourth telltale example includes lamp telltale 66, controlled by FET 68. When the output on line 36 (here coupled to a push-pull driver) is low, the gate of FET 68 is low, preventing current from flowing through the drain-source circuit of FET 68 and lamp telltale 66. However, when the output on line 36 is high, the gate of FET 68 is raised high, allowing current to flow through the drain-source circuit of FET 68 and through lamp telltale 66, whereby the lamp telltale 66 emits light.

When an incandescent lamp is used in a telltale, its initial low impedance when it is being turned on causes a current surge through the lamp as it is being turned on. This initial current surge flows through ground line 65, which is used to ground both the telltales and the integrated circuit 72. The current surge through ground line 65 is multiplied by the line resistance 67 of ground line 65 causing, for a short period of time, an effective voltage drop, Ve, between the ground connection of integrated circuit 72 and the sender grounds.

The effective voltage rise Ve between the ground connection for integrated circuit 72 and the sender grounds causes the filter circuits 20 to "feel" an effective drop in the sender signals, even though no such drop exists. The effect of the voltage drop Ve could destabilize the filter circuits 20. To prevent the voltage drop Ve from destabilizing the circuits 20, stabilization circuit 47 is added.

Stabilization circuit 47 interrupts the filter circuits for a short period, e.g., 0.5 seconds, during the turn-on of an incandescent lamp. When stabilization circuit 47 receives a signal through one of the lines 36, indicating that a telltale is being turned on, it sends a low signal pulse, with a duration of about 0.5 seconds, through line 49. Inverters 61 and 63 are implemented when a low level signal on line 36 indicating that a telltale is to be turned on. The low signal on line 49 is input to AND gates 48, whose outputs responsively hold low lines 41, the clock inputs to filter circuits 20. With lines 41 held low, the filter circuits 20 cannot be clocked, preventing any current surges through the ground line 65 from affecting the outputs of filter circuits 20.

After the period of the low pulse runs out, line 49 goes high again, enabling the clock signals from lines 43 to be input to filter circuits 20, resuming the circuitry to normal filter operation. Stabilization circuit 47 is clocked from a signal in line 46, which is tapped into the clock circuit 45. A more detailed description of stabilization circuit 47 is shown in FIG. 3.

Figure 3:
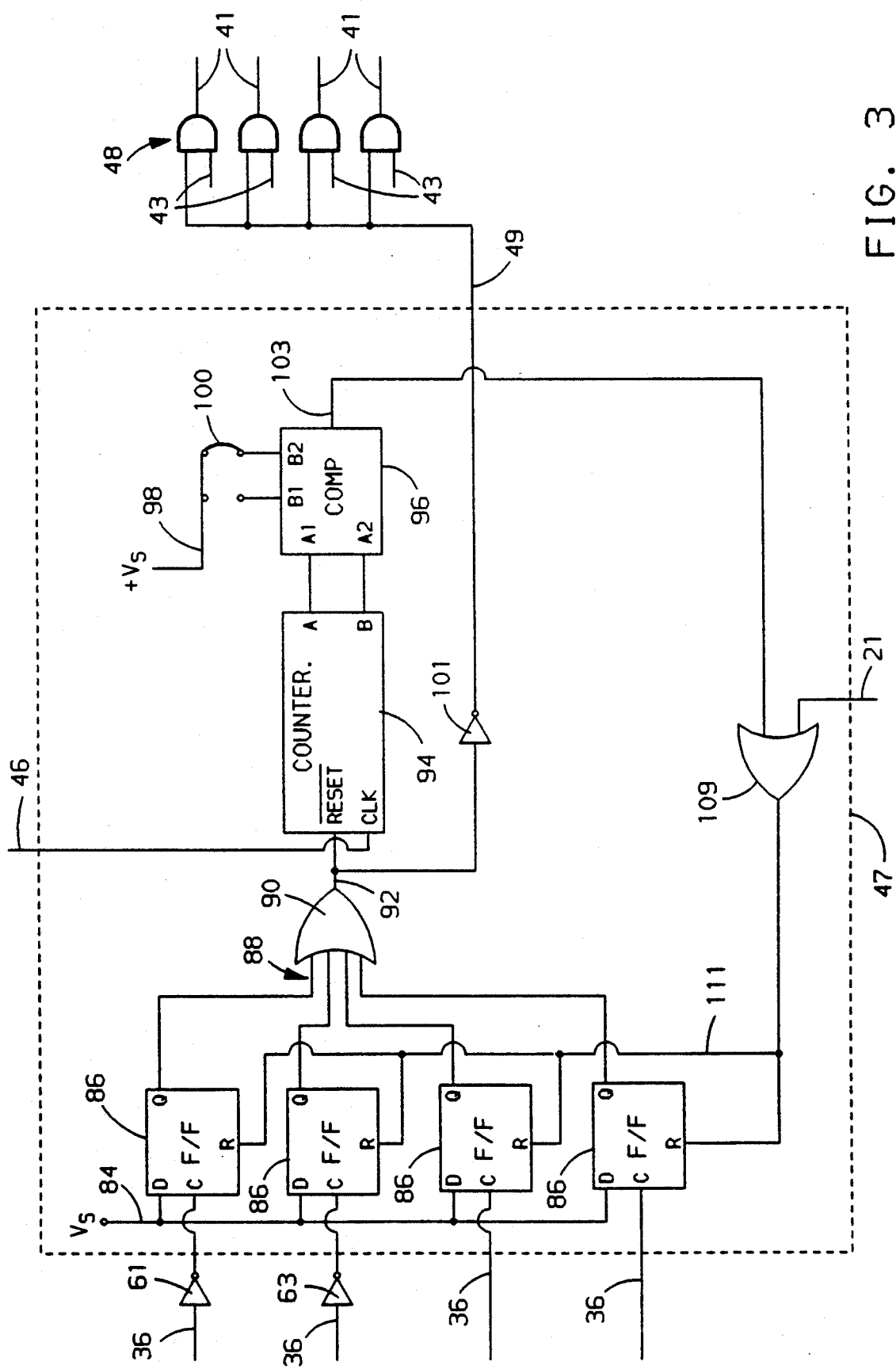
FIG. 3 is a more detailed illustration of the stabilization circuitry shown in FIG. 2.

Referring to FIG. 3, stabilization circuit 47 comprises flip flops 86, OR gate 90, counter 94, and digital comparator 96. The outputs 36 of the filter circuits 20 are coupled to the clock inputs of flip flops 86, which have their D inputs coupled to the circuit's positive voltage supply. A high level signal on the clock input of one of the flip flops 86 produces a high level signal at the corresponding Q output, each of the Q outputs being coupled to OR gate 90 through lines 88. OR gate 90 couples the Q output signal to line 92, which is connected to the /RESET input of counter 94 and to inverter 101.

When the /RESET input of counter 94 receives a high level signal on line 92, the counter 94 starts counting with the clock pulses from line 46. Line 46 is tapped into a low frequency output (e.g., 0.25 hertz) of divider 44 in clock circuit 45.

The output of counter 94 is coupled to the A1 and A2 inputs of comparator 96. The B1 and B2 inputs of comparator 96 are selectively masked to circuit voltage supply line 98, e.g., through contact mask 100 in the IC. When the A1, A2 inputs of comparator 96 match the masked B1, B2 inputs, comparator 96 outputs a high level signal on line 103. Line 103 is coupled to the reset inputs of flip flops 86 via OR gate 109 and line 111 and the high level signal on line 103 resets flip flops 86.

In operation, line 49, the output of inverter 101, is normally high, enabling the clock signals on line 43 to be coupled to lines 41 through AND gates 48. When a signal on one of the lines 36 indicates that a telltale is being switched on, line 92 goes high as explained above. When line 92 goes high, line 49 goes low, preventing the clock pulses for the filter circuits 20 from being coupled to lines 41. Line 49, however, only stays low until comparator 96 outputs a high level signal on line 103, which resets flip flops 86, causing line 92 to go low and line 49 to return to its normally high state. The duration of the resulting low pulse on line 49 is determined by the frequency of the clock signal on line 46 and the masking of the B1, B2 inputs of comparator 96. A master reset signal on line 21, which is output by power supply 13 (FIG. 2) resets flip flops 86 at power up.

Figure 4:
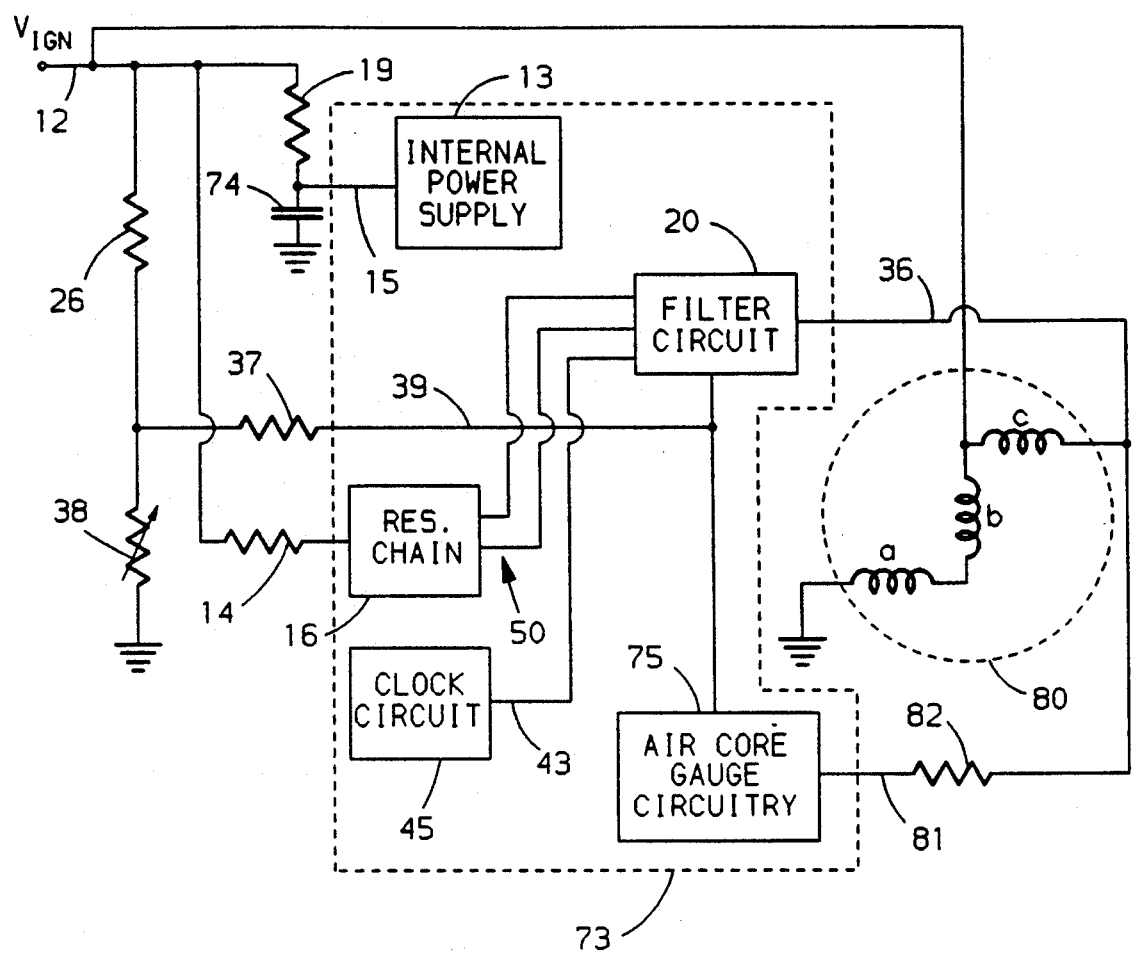
FIG. 4 is a schematic diagram of an example IC implementation of this invention with an air core gauge.

Referring to FIG. 4, this invention need not be used to only drive a telltale that emits light as in the above examples. Instead, this invention may be implemented with an air core gauge such as a fuel gauge or an oil pressure gauge. The air core gauge may be used as an indicator either by itself or in conjunction with a light emitting a telltale indicator by providing for pegging or switch-off of the gauge during warning conditions. This helps ensure that when a warning condition is reached, the gauge reading is in the warning zone, compensating for a possibly inaccurate gauge.

In FIG. 4, the IC circuit package 73 contains internal power supply 13, resistor chain 16, clock circuit 45, air core gauge circuitry 75 and a filter circuit 20. The IC is connected to resistors 14, 19, 26, and 37, sender 38 and capacitor 74 as described above. Filter circuit 20 is coupled to resistor chain 16 and clock circuit 45 as described above.

Line 39, containing the sender signal, is fed into both circuit 20 and air core gauge circuitry 75. The air core gauge circuitry 75 may be conventional air core gauge circuitry, readily known to those skilled in the art or any other suitable type of air core gauge circuitry.

Air core gauge 80 is a conventional three-coil gauge comprising coils a, b and c and receives biasing current for coils a and b from ignition voltage supply line 12. A signal on line 81 at the output of the air core gauge circuitry 75 varies, in a way known to those skilled in the art, in relation to the parameter being measured by sender 38. The coil c is energized through the signal provided on line 81 and resistor 82. As the signal in line 81 varies, air core gauge 80 rotates a pointer (not shown).

Line 36, the output of the filter circuit 20 is connected to an open drain output within filter 20. When filter circuit 20 pulls line 36 low, coil c is fully energized between ignition voltage and ground, and the resistor 82 isolates coil c from the signal on line 81. When coil c is fully energized, air core gauge 80 swings pointer 80 to the maximum rotational position to act as an indication to a vehicle operator. This may be used to ensure that the gauge indicates a warning reading when the trip point is reached. Depending upon the system implementation, the maximum rotational position of the air core gauge may correlate directly or inversely with the measure of the parameter being measured by sender 38.

Many variations to the above air core gauge implementation may be used. For example transistors may be coupled as switching elements to switch on or off gauges in response to signals on lines 36.

Figure 5:
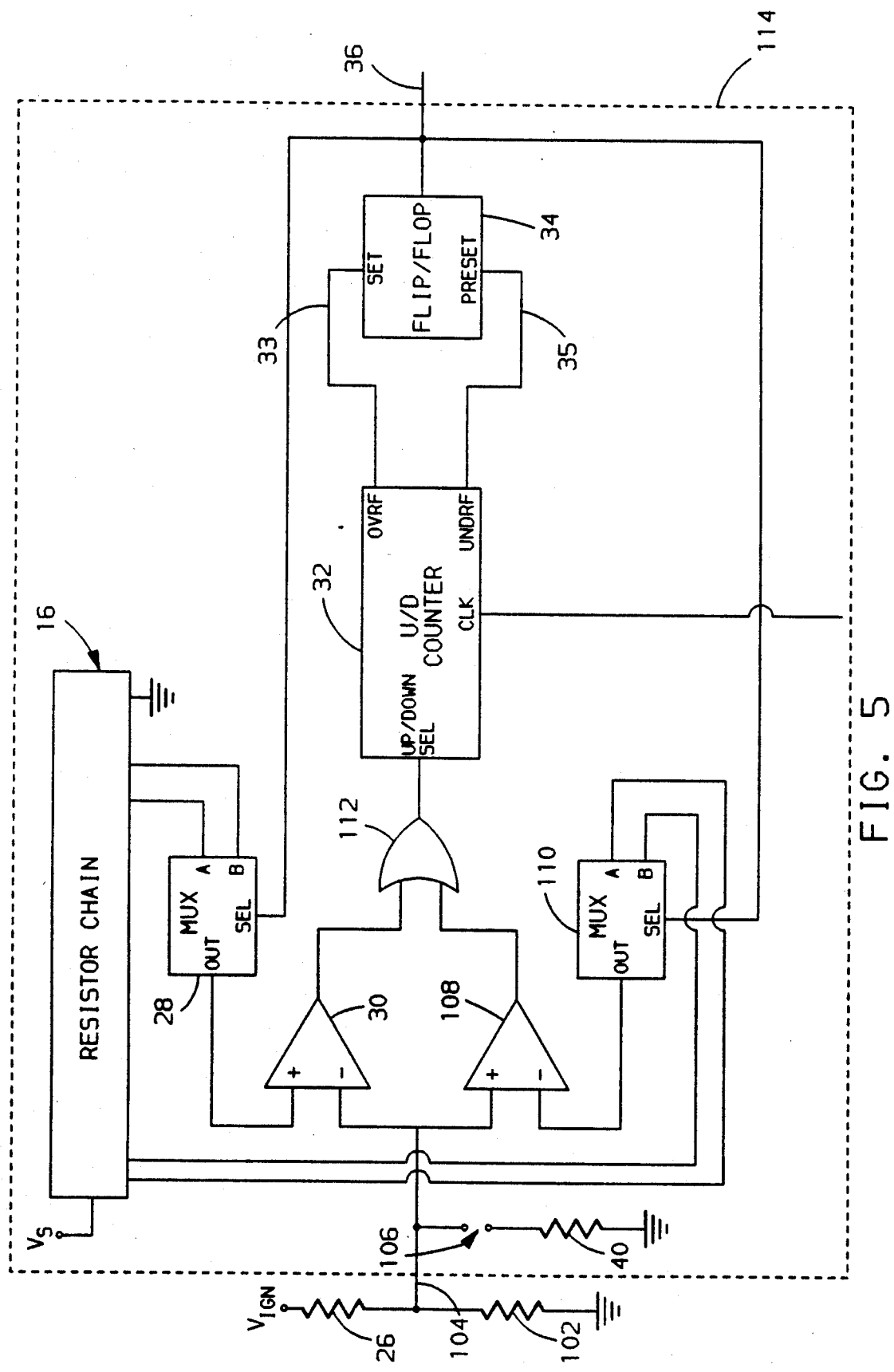
FIG. 5 is an alternative implementation of this invention, useful for measuring and filtering with hysteresis voltage signals.

Referring to FIG. 5, this invention may be implemented to measure whether parameters are within or outside of a window of acceptable values. One such parameter is the vehicle ignition voltage. Because it is desirable to know both if the window parameter is too low and too high, circuit 114 shown affects the control signal on line 36 if either the window parameter is too low or too high. The implementation shown is suitable for determining whether the vehicle ignition voltage is too low or too high.

The resistor divider pair comprising resistors 26 and 102 is coupled between the vehicle ignition voltage and ground. Line 104, connected to the junction of resistors 26 and 102, provides a signal indicative of the ignition voltage at a voltage level and a current level safe for the integrated circuit package 114.

Line 104 is connected to the inverting input of comparator 30 and the non-inverting input of comparator 108. The non-inverting input of comparator 30 is connected to the output of multiplexer 28 and the inverting input of comparator 108 is connected to the output of multiplexer 110. The select inputs of multiplexers 28 and 110 are both connected to line 36, the output of flip flop 34. The outputs of comparators 30 and 108 are coupled, via OR gate 112, to the up/down select of up/down counter 32. Up/down counter 32 is clocked as described above.

The A and B inputs to multiplexers 28 and 110 are tapped into different points on resistor chain 16. In this implementation, resistor chain 16 is connected between the integrated circuit power supply, which is regulated, and ground. With resistor chain 16 connected to a regulated power supply, the reference voltages at the taps in the resistor chain do not vary as vehicle ignition voltage varies, and thereby provide references against which vehicle ignition voltage can be compared.

The A and B inputs of multiplexer 28 are tapped into the resistor chain 16 at references corresponding to a low voltage trip point for the circuit, with the A input being referenced to a slightly lower voltage than the B input. The A and B inputs of multiplexer 110 are tapped into the resistor chain 16 at references corresponding to a high voltage trip point for the circuit, with the A input being referenced to a slightly higher voltage than the B input.

In operation, the circuit is initialized with a low level control signal on line 36. When the low level control signal on line 36, multiplexers 28 and 110 couple the references at their A inputs to the comparators 30 and 108. If the signal on line 104 falls below the reference signal at the A input for multiplexer 28, a high level signal is output from comparator 30 and coupled to the up/down select of up/down counter 32 via OR gate 112. When the up/down select of up/down counter 32 receives the high level signal from comparator 30, it counts up with the pulses at its clock input. If the average output of comparator 30 is the high level signal for enough clock pulses for up/down counter 32 to overflow, then flip flop 34 is set, and the control signal on line 36 goes high. When the control signal on line 36 goes high, multiplexer 28 is selected so that the B input is coupled to the non-inverting input of comparator 30, so that the signal on line 104 must be above the higher reference at the B input of multiplexer 28 for the up/down counter 32 to count down. Since the inputs of multiplexer 110 are coupled to higher voltage references, they have no effect at the low trip point.

Assuming now that the signal on line 104 is between the low and high voltage trip points, the control signal on line 36 is low and the A input of multiplexer 110 is coupled to the inverting input of comparator 108. When the signal on line 104 rises above the reference at the A input of multiplexer 110, comparator 108 outputs a high level signal, which is coupled to the up/down select of up/down counter 32 via OR gate 112. The up/down counter counts up in response to the signal on line 104 being higher than the voltage reference at the A input of multiplexer 110. If the average signal on line 104 is greater than the reference at the A input of multiplexer 110 for enough counts for up/down counter 32 to overflow, then flip flop 34 is set and the control signal on line 36 goes high. When the control signal on line 36 goes high, the voltage reference at the B input of multiplexer 110 is coupled to the inverting input of comparator 108. When the voltage reference at the B input of multiplexer 110 is coupled to the inverting input of comparator 108, the signal on line 104 must be below the reference at the B input of multiplexer 110 for enough clock pulses to underflow up/down counter 32 and reset flip flop 34 before the control signal on line 36 will go low again.

Line 36 can be coupled to any of the telltales or indicators described above to indicate when ignition voltage goes above the high trip point and when ignition voltage goes below the low trip point, with hysteresis provided by the circuit preventing telltale flickering near the trip points.

An alternative to resistor chain 16 and a regulated voltage supply in this implementation is to use a bandgap voltage supply with various taps, which can be coupled to the input lines of multiplexers 28 and 110.

Resistor 40 is provided with lead 106 so that it may be masked to line 104 if it is desired to connect line 104 to a variable resistance sender 38 described above, instead of the implementation shown in FIG. 5. If a variable resistance sender is being used, resistor chain 16 is coupled to ignition voltage as shown FIG. 2 to maintain the ratiometric inputs of the comparators 30 and 108.

Figure 6:
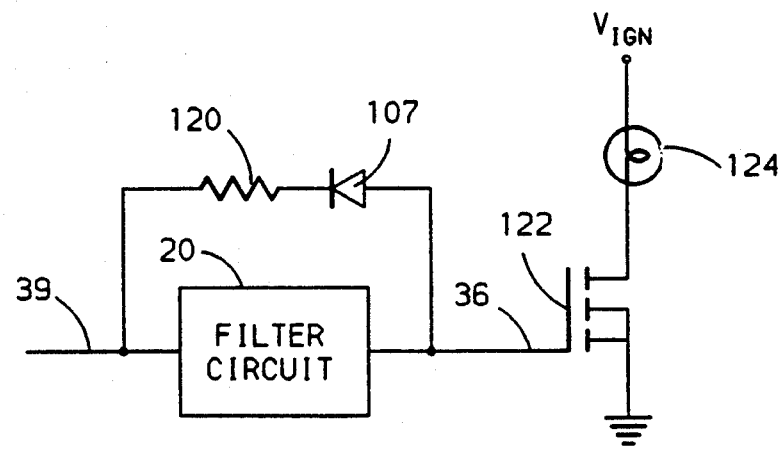
FIG. 6 is an alternative implementation of this invention in which the telltale flashes when the parameter being sensed is near the trip point.

Referring to FIG. 6, this invention can be implemented to provide periodic flashing of a telltale when the signal on line 39 from a sender 38 first reaches a trip point. Assuming that the circuit is set up so that the signal on line 36 goes high when the signal on line 39 is below the first reference for a requisite number of clock pulses. For this implementation, line 39 is coupled to the inverting input of comparator 30 (FIG. 1), multiplexer 28 (also FIG. 1) is coupled to the non-inverting input of comparator 30, and the first reference (A input) is lower than the second reference (B input).

When line 36 goes high, FET 122 switches on lighting telltale 124. Also when line 36 goes high, resistor 120, coupled between line 36 and line 39, acts with resistor 40 as a voltage divider and raises the level of the signal on line 39. If the signal from the sender is not low enough, current through diode 107 and resistor 120 pulls line 39 above the second reference, causing up/down counter 32 to count down and underflow, bringing line 36 low, turning off transistor 122 and telltale 124. With line 36 low again, diode 107 isolates line 39 from line 36 and the sender signal can again bring line 39 low. Line 39 therefore starts up/down counter 32 counting until it overflows, bringing line 36 high. The cycle repeats, flashing telltale 124 until the sender signal on line 39 is so low that resistor 120 cannot bring line 39 above the second reference, at which point telltale 124 stays on until current from the sender and current through resistor 120 and diode 107 bring the signal on line 39 above the trip point. If the counter clocks are stopped with lamp turn on and turn off by stabilization circuitry 47 (FIGS. 2 and 3), the flash period of the telltale is lengthened by the stabilization period.

Figure 7A:
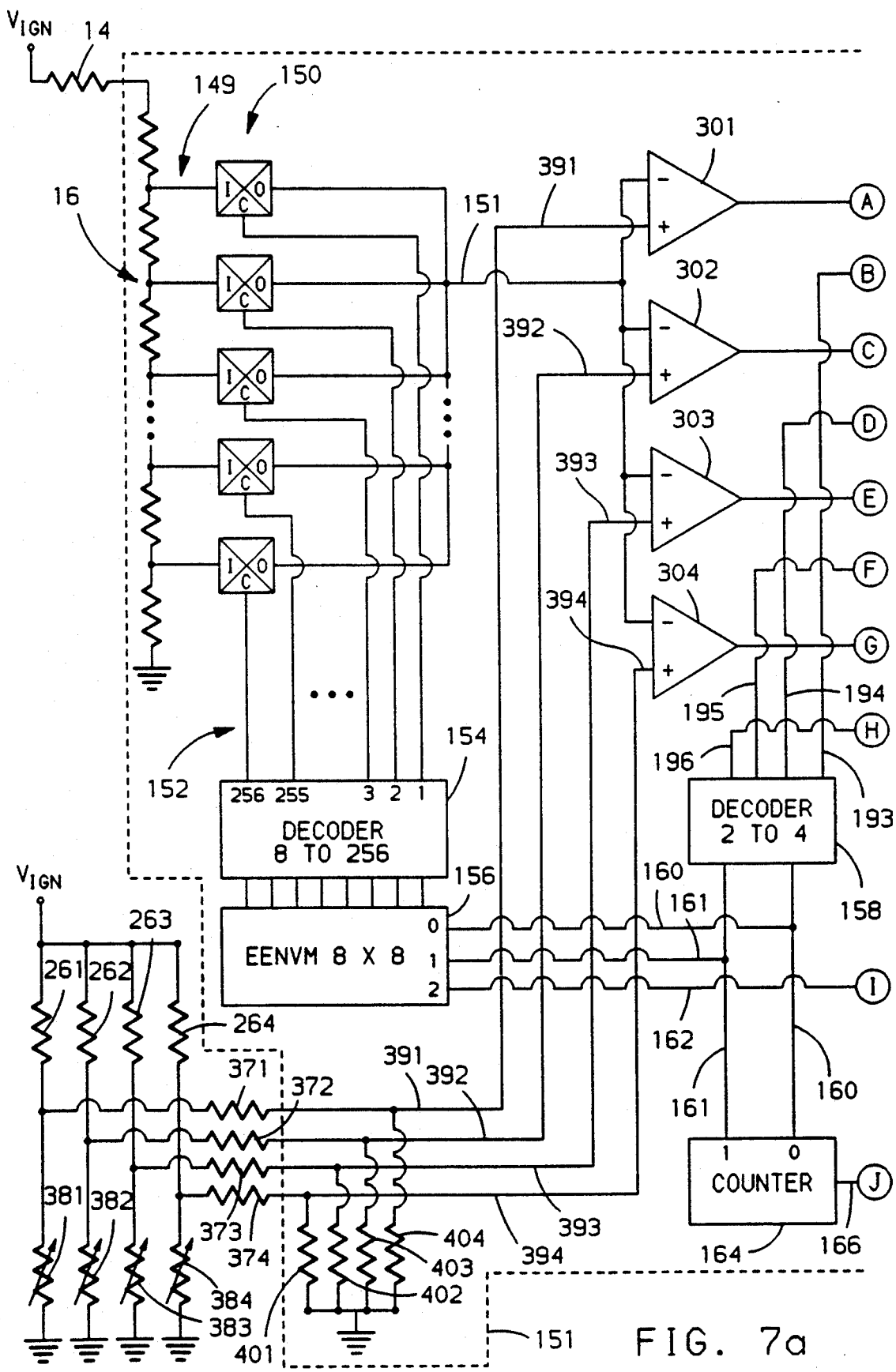
FIGS. 7a and 7b comprise a schematic illustration of an implementation of this invention in which trip points are programmable in non-volatile memory.
Figure 7B:
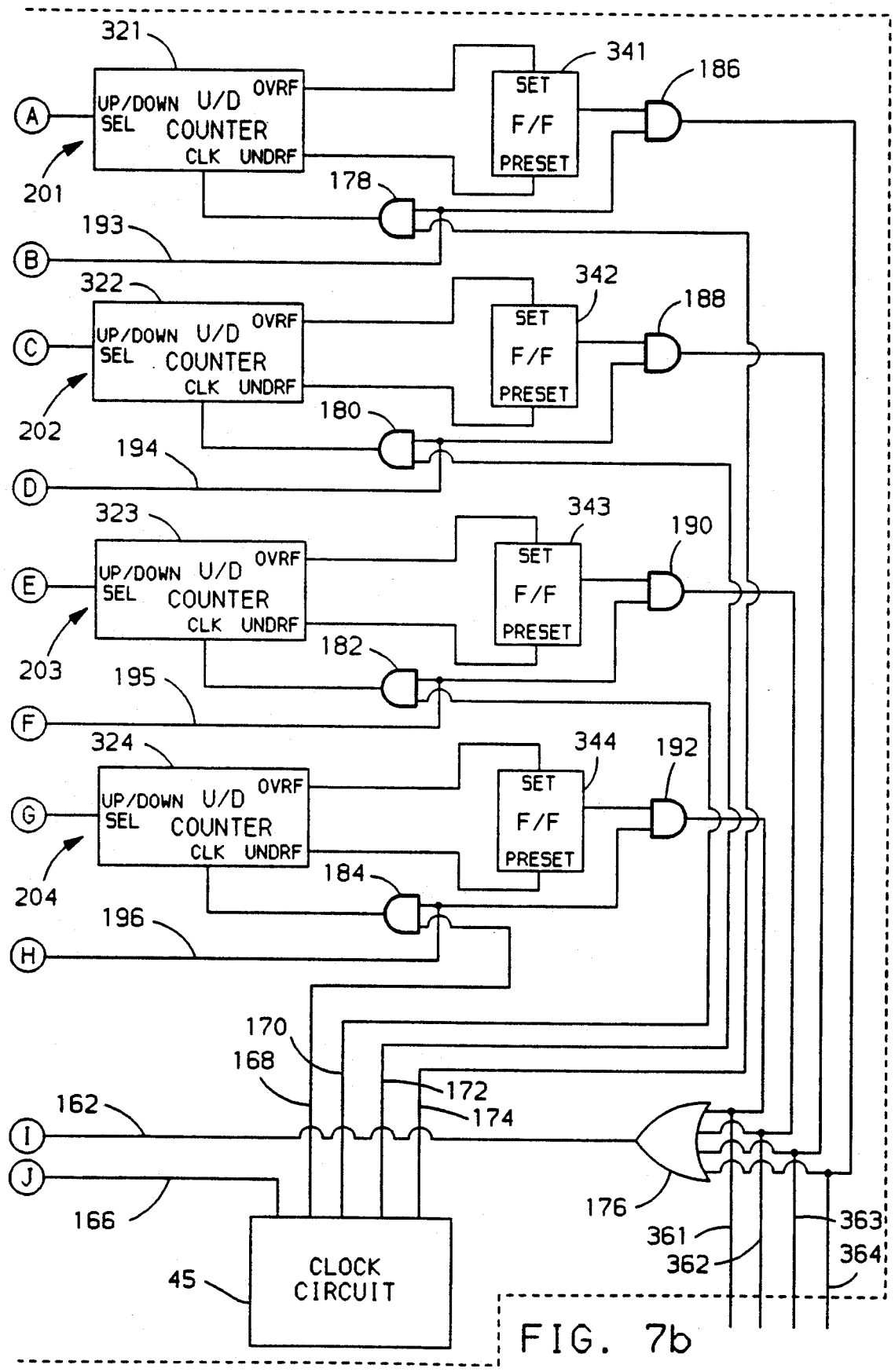

Referring to FIGS. 7a and 7b, an implementation in which multiplexer 28 is replaced with different means for alternately selecting between the first and second signals in response to the control signal is shown. The example shown in FIGS. 7a and 7b is programmable so that first and second reference voltages for each of the comparators 301, 302, 303, and 304 can be programmed after manufacture of the integrated circuit 151.

The circuit shown includes four load resistors 261-264, connected to senders 381-384. The sender outputs are coupled to lines 391-394 through resistor divider pairs comprising resistors 371-374 and resistors 401-404 as shown. The signals on lines 391-394 represent four different measurement signals, all of which are filtered, with hysteresis, on integrated circuit 151.

Lines 391-394 are connected to the non-inverting inputs of comparators 301-304 as shown. The inverting inputs of comparators 301-304 are all connected to line 151. The circuitry comprising OR gate 176, clock circuit 45, counter 164, decoder 158, memory 156, decoder 154, resistor chain 16 and transmission gates 150 comprise circuitry for multiplexing the reference voltages for each comparator 301-304 on line 151.

Specifically, resistor chain 16 is a chain of a predetermined number of resistors, as described above. The predetermined number is determined by the required resolution of available trip points. In this example, the number of resistors in resistor chain 16 is 256. Between every two resistors in resistor chain 16 is a tap 149 coupled to a transmission gate 150. When any transmission gate 150 receives a signal on the c input, the voltage signal on the corresponding tap 49 is coupled to line 151. Transmission gates 150 are selectively operated through select lines 152, connected to the output of decoder 154.

Decoder 154 is an 8 to 256 decoder controlled by the eight output lines of memory 156. Memory 156 is an 8×8 array of electronically erasable non-volatile memory. The eight memory addresses in memory 156 are selected by address lines 160-162.

Counter 164 is a two bit counter clocked by clock line 166 tapped into clock circuit 45 at a relatively low frequency, e.g. 40 Hz. As counter 164 counts, the address lines 160 and 161 count, in a cyclical manner, from 0 to 3 in binary. Selecting four memory locations in memory 156 one after the other. The memory locations whose addresses end in 00 (binary) hold the reference voltages for comparator 301. The memory locations whose addresses end in 01 hold the reference voltages for comparator 302. The memory locations whose addresses end in 10 hold the reference voltages for comparator 303. The memory locations whose addresses end in 11 hold the reference voltages for comparator 304. The first and second reference voltages are selected by address line 162, coupled to each of the four filter outputs 361-36, through OR gate 176.

In operation, counter 164 is clocked by clock circuit 45 and continuously counts from 0 to 3. Lines 160 and 161, output from counter 164, are connected to the input of decoder 158, a 2 to 4 line decoder. Since counter 164 continuously counts from 0 to 3, decoder output lines 193-196 are selectively high, one by one, for a period equal to one clock period on line 166.

Line 193 is connected to one of the inputs of AND gate 178 and one of the inputs of AND gate 186. When counter 164 is at 0, line 193 goes high and an address ending in 00 is selected in memory 156. Also, when line 193 goes high, the clock signal for filter 201 on line 174 is coupled to the clock input of up/down counter 321, enabling filter 201. Additionally when line 193 is high, the output of flip flop 341, the control signal for filter 201, is coupled to line 364, which is connected to one of the inputs of OR gate 176. OR gate 176, couples the control signal on line 364 to line 162, the third address input for memory 156. All of the other filters, 202-204, are disabled via the low signals on lines 194-196 and AND gates 180, 182, 184, 188, 190 and 192. Thus, the reference voltages for filter 201 are selected in a manner similar to how the two reference voltages are selected for filter 20 of FIG. 1. Here, instead of multiplexer 28 being selected, memory 156, which controls decoder 156 and transmission gates 150, is selected.

For example, assuming the output of flip flop 341 is low, and the output of counter 164 is 00, the address 000 in memory 156 is selected. Address 000 contains a byte representing the first reference signal of two tap points corresponding to filter 201. The output of decoder 154 selects the transmission gate 150 connecting the first reference signal corresponding to filter 201 to line 151. As the signal on line 391 rises above the selected reference signal, up/down counter 321 starts counting up. When up/down counter 321 overflows, flip/flop 341 is set, bringing the control signal on lines 364 and 162 high. When line 162 is high, the address 100 in memory 156 is selected. Address 100 contains a byte representing the second reference signal corresponding to filter 201, which is lower than the first reference signal. Decoder 154 selects the transmission gate 150 connecting the second reference signal corresponding to filter 201 to line 151. Now the signal on line 391 must fall below the second reference signal for filter 201 before filter 201 starts counting down. Hence the circuit provides hysteresis.

When the output of counter 164 is 01, decoder 158 selects line 194, bringing line 193 low and maintaining lines 195 and 196 low. When line 193 goes low, filter 201 is disabled. When line 194 goes high, filter 202, including up/down counter 322 and flip flop 342, is activated via AND gates 180 and 188. When active, filter 202 operates similarly to the active operation of filter 201 described above, with the control signal on line 363 coupled to line 162 via OR gate 176. The first and second reference signals corresponding to filter 202 are coupled to line 151 by selecting addresses 001 and 101 in memory 154.

When the output of counter 164 is 10, decoder 158 selects line 195, bringing line 194 low and maintaining lines 193 and 196 low. When line 194 goes low, filter 202 is disabled. When line 195 goes high, filter 203, including up/down counter 323 and flip flop 343, is activated via AND gates 182 and 190. When active, filter 203 operates similarly to the active operation of filter 201 described above, with the control signal on line 362 coupled to line 162 via OR gate 176. The first and second reference signals corresponding to filter 203 are coupled to line 151 by selecting addresses 010 and 110 in memory 154.

When the output of counter 164 is 11, decoder 158 selects line 196, bringing line 195 low and maintaining lines 193 and 194 low. When line 195 goes low, filter 203 is disabled. When line 196 goes high, filter 204, including up/down counter 324 and flip flop 344, is activated via AND gates 184 and 192. When active, filter 204 operates similarly to the active operation of filter 201 described above, with the control signal on line 361 coupled to line 162 via OR gate 176. The first and second reference signals corresponding to filter 204 are coupled to line 151 by selecting addresses 011 and 111 in memory 154.

The control signals on lines 361-364 are used to drive displays, such as those described above, to indicate to an operator a state of a parameter.

In the above described example, each filter 201-204 is selected in turn, operating for 25 ms at a time, and is off 75% of the time. Since the filters are selectively activated, their effective time constants are responsive to the clock rate on line 166 and the clock rates on lines 168-174.

The reference signals for the circuitry in FIGS. 7a and 7b are easily set by one skilled in the art by programming memory 156. Memory 156 provides the advantage of not having to mask reference points in the resistor chain, and allows reference levels to be set after the IC is manufactured.

The example illustrated in FIGS. 7a and 7b includes four filters 201-204. The use of memory 156, decoder 154 and transmission gates 150 may be also applied to integrated circuits with just one filter, two or three filters, or with more than four filters. If only one filter is used, counter 164 and decoder 158 are not necessary, and memory 156 need only have two bytes. Memory 156 is expanded by two bytes for every filter added. Also, for every filter added, counter 164 and decoder 158 are adjusted accordingly. These alternative implementations are easily accomplished by one skilled in the art with the information set forth herein.

In the above examples, the resistor chain 16 may be replaced by an R-2R ladder or any other multiple referencing means.

Any of the above telltale or gauge implementations are equally desirable means for alerting the operator of the presence of a high or low parameter measurement. Any of the above implementations can be used in combination with any of the other above implementations to drive a variety of different telltales. The above illustrations are just example implementations for alerting the operator and are not limiting on this invention.

Various other improvements and modifications to this invention may occur to those skilled in the art and will fall within the scope of this invention as set forth below.

The embodiments of the invention in which an exclusive property or privilege is claimed are defined as follows:

1. A circuit for processing a measurement signal responsive to a sender for measuring a vehicle parameter, comprising:
   means for providing first and second reference signals alternately selected in response to a control signal, the first reference signal selected if the control signal is a first signal condition and the second reference signal selected if the control signal is a second signal condition, the first reference signal being above the second reference signal;
   means for comparing the measurement signal to the selected reference signal and providing a comparison output signal therefrom;
   means for filtering the comparison output signal, including an up/down counter having overflow and underflow outputs providing overflow and underflow output signals as a filtered response to the comparison output signal;
   means for providing the control signal in response to the overflow and underflow output signals, the control signal comprising the first signal condition if the measurement signal is below the selected reference signal for a predetermined number of clock pulses and the control signal comprising the second signal condition if the measurement signal is above the selected reference signal for a predetermined number of clock pulses, whereby the control signal is filtered and has hysteresis minimizing repeated switching of the control signal between the first and second signal conditions when the parameter measurement is near a selected reference level;
   means for alerting an operator in response to the control signal.

2. The circuit of claim 1 wherein the means for alerting the operator in response to the control signal includes a telltale which emits light in response to only one of the two conditions of the control signal.

3. The circuit of claim 1 wherein the means for alerting the operator in response to the control signal includes an air core gauge, responsive to one of the two conditions of the control signal.

4. The circuit of claim 1 wherein the reference signal means comprises:
   a resistor chain, coupled between a vehicle ignition voltage and ground and having a set of taps, each tap at a junction between two resistors in the resistor chain, wherein a first tap of the set of taps provides the first reference signal and a second tap of the set of taps provides the second reference signal; and
   a multiplexer having a select input coupled to the control signal means, reference inputs coupled to the first and second taps, and an output coupled to the comparison means.

5. The circuit of claim 1 wherein the reference signal means comprises:
   a resistor chain, coupled between a vehicle ignition voltage and ground and having a set of taps, each tap at a junction between two resistors in the resistor chain, wherein a first tap of the set of taps provides the first reference signal and a second tap of the set of taps provides the second reference signal; and
   a memory unit having an address input coupled to the control signal means and a data output selecting the first and second reference signals in response to the control signal.

6. The circuit of claim 1 wherein the comparing means comprises a comparator with two inputs, one of the comparator inputs being an inverting input and the other a non-inverting input, wherein one of the comparator inputs is coupled to the measurement signal, the other comparator input is coupled to the selected reference signal, and an output of the comparator provides the comparison output signal.

7. The circuit of claim 1 wherein the filtering means comprises:
   a clock circuit providing clock pulses on a clock line; and wherein
   the up/down counter includes a clock input coupled to the clock line, a select input receiving the comparison output signal, and underflow and overflow outputs, wherein in response to a first state of the comparison output signal, the up/down counter counts in a first direction and in response to a second state of the comparison output signal the up/down counter counts in a second direction.

8. The circuit of claim 7 wherein the control signal means comprises a flip flop having two inputs, a set input and a preset input, one of the two inputs coupled to the overflow output of the up/down counter and the other of the two inputs coupled to the underflow output of the up/down counter, the flip flop also having an output which outputs the control signal, the control signal being the first signal condition when one of the flip flop inputs receives a high level signal and the control signal being the second signal condition when the other of the flip flop inputs receives a high level signal.

9. The circuit of claim 8 wherein the clock circuit comprises an oscillator and a divider circuit, the divider circuit having successive frequency dividers connected in series and a first frequency divider in the series receiving pulses from the oscillator, wherein each frequency divider has an output providing a signal with a clock frequency one half the clock frequency the preceding frequency divider, and wherein the clock line is coupled to one of the divider outputs.

10. The circuit of claim 9 wherein the clock line is coupled to one of the divider outputs with a metal mask in an integrated circuit package.

11. The circuit of claim 1 wherein the reference signal means, comparing means, filtering means, and control signal means are all fabricated onto a single integrated circuit.

12. The circuit of claim 1 also comprising a stabilization means for disabling the filter means for a predetermined period of time after the control signal achieves the first signal condition.

13. The circuit of claim 1 also comprising a stabilization means for disabling the filter means for a predetermined period of time after the control signal achieves the second signal condition.

14. The circuit of claim 1 also comprising means, coupled between the control signal means and the comparing means, for providing flashing operation of the alerting means.

15. The circuit of claim 1 wherein the reference signal means comprises:
   a resistor chain, coupled between a vehicle ignition voltage and ground and having a set of taps, each tap at a junction between two resistors in the resistor chain, wherein a first tap of the set of taps provides the first reference signal and a second tap of the set of taps provides the second reference signal;
   a memory unit having an address input coupled to the control signal means and a data output coupled to a decoder;
   the decoder output coupled to a set of transmission gates, each transmission gate coupled to one tap of the set of taps and to the comparing means, selecting the first and second reference signals in response to the data output of the memory unit.

16. A circuit for processing a measurement signal indicative of a vehicle parameter, indicating if the vehicle parameter is below a first desired level or above a second desired level, comprising:
   means for providing first and second reference signals alternately selected in response to a control signal, the first reference signal selected if the control signal is a first signal condition and the second reference signal selected if the control signal is a second signal condition, the first reference signal being above the second reference signal;
   means for providing third and fourth reference signals alternately selected in response to the control signal, the fourth reference signal selected if the control signal is the first signal condition and the third reference signal selected if the control signal is the second signal condition, the third reference signal being above the fourth reference signal, the first and second reference signals being above the third reference signal;
   means for comparing the measurement signal to the selected reference signals and for providing a comparison output signal therefrom, wherein (i) if the first and fourth reference signals are selected, the comparison output signal has a first state if the measurement signal is below the first reference signal and above the fourth reference signal and a second state if the measurement signal is above the first reference signal or below the fourth reference signal, and (ii) if the second and third reference signals are selected, the comparison output signal has the first state if the measurement signal is below the second reference signal and above the third reference signal and the second state if the measurement signal is above the second reference signal or below the third reference signal;
   means for filtering the comparison output signal, including an up/down counter having overflow and underflow outputs providing overflow and underflow output signals as a filtered response to the comparison signal;
   means for providing the control signal in response to the overflow and underflow output signals, the control signal comprising the first signal condition if the comparison output signal has the second state for a predetermined number of clock pulses and the control signal comprising the second signal condition if the comparison output signal has the first state for a predetermined number of clock pulses, whereby the control signal is filtered and has hysteresis minimizing repeated switching of the control signal between the first and second signal conditions when the measurement signal is near one of the selected reference levels;
   means for alerting an operator in response to the control signal.

17. The circuit of claim 16 wherein the reference signal means comprise:
   a resistor chain, coupled between a regulated voltage supply and a ground, and having a set of taps, each tap at a junction between two resistors in the resistor chain, wherein a first tap of the set of taps provides the first reference signal, a second tap of the set of taps provides the second reference signal, a third tap of the set of taps provides the third reference signal and the fourth tap of the set of taps provides the fourth reference signal;
   a first multiplexer having a select input coupled to the control signal means, reference inputs coupled to the first and second taps, and an output coupled to the comparison means; and
   a second multiplexer having a select input coupled to the control signal means, reference inputs coupled to the third and fourth taps, and an output coupled to the comparison means.

18. The circuit of claim 16, wherein the comparing means comprises:
   a first comparator, with an inverting input and a non-inverting input wherein the non-inverting input is coupled to the measurement signal and the inverting input is coupled to either the first or the second reference signal, whichever is selected;
   a second comparator, with an inverting input and a non-inverting input wherein the inverting input is coupled to the measurement signal and the non-inverting input is coupled to either the third or fourth reference signal, whichever is selected;
   an OR gate with two inputs and an output, the two inputs coupled to outputs of the first and second comparators, wherein the output of the OR gate is the comparison output signal.

19. The circuit of claim 16 wherein the filtering means comprises:
   a clock circuit providing clock pulses on a clock line; and wherein
   the up/down counter includes a clock input coupled to the clock line, a select input receiving the comparison output signal, and underflow and overflow outputs, wherein in response to a first state of the comparison output signal, the up/down counter counts in a first direction and in response to a second state of the comparison output signal the up/down counter counts in a second direction.

20. The circuit of claim 19 wherein the control signal means comprises a flip flop having two inputs, a set input and a preset input, one of the two inputs coupled to the overflow output of the up/down counter and the other of the two inputs coupled to the underflow output of the up/down counter, the flip flop also having an output which outputs the control signal, the control signal being the first signal condition when one of the flip flop inputs receives a high level signal and the control signal being the second signal condition when the other of the flip flop inputs receives a high level signal.

21. The circuit of claim 19 wherein the clock circuit comprises an oscillator and a divider circuit, the divider circuit having successive frequency dividers connected in series and a first frequency divider in the series receiving pulses from the oscillator, wherein each frequency divider has an output providing a signal with a clock frequency one half the clock frequency the preceding frequency divider, and wherein the clock line is coupled to one of the divider outputs.

22. The circuit of claim 21 wherein the clock line is coupled to one of the divider outputs with a metal mask in an integrated circuit package.

23. The circuit of claim 16 wherein the first and second reference signal means, comparing means, filtering means, and control signal means are all fabricated onto a single integrated circuit.

24. The circuit of claim 16 also comprising a stabilization means for disabling the filter means for a predetermined period of time after the control signal achieves the first signal condition.

25. The circuit of claim 16 also comprising a stabilization means for disabling the filter means for a predetermined period of time after the control signal achieves the second signal condition.

26. The circuit of claim 16 also comprising feedback means, coupled between the control signal means and the comparing means, for providing flashing operation of the altering means.

27. The circuit of claim 16 wherein the alerting means includes a telltale which emits light in response to only one of the two control signal conditions.

28. The circuit of claim 16 wherein the alerting means includes an air core gauge responsive to one of the two control signal conditions.

29. An apparatus for trip point application, comprising:
means for receiving an input signal, means for comparing the input signal to a selected signal and means for providing a comparison signal in response to the comparison, the comparison signal having either a first or second state, the selected signal being either a first or a second reference signal, the first reference signal being higher than the second reference signal, the comparison signal having the first stage if the input signal is higher than the selected signal and the second state if the input signal is lower than the selected signal;
an up/down counter selectively counting in a first direction if the comparison signal is the first state and selectively counting in a second direction if the comparison signal is the second state, the up/down counter having overflow and underflow outputs providing overflow and underflow output signals therefrom; and
a multiplexer for selecting one of the reference signals in response to the overflow output signal and selecting the other reference signal in response to the underflow output signal, whereby, by selecting between the first and second reference signals, the apparatus filers with hysteresis; and
means for signaling responsive to the overflow and underflow outputs of the multiplexer.

30. The apparatus of claim 29 wherein the first and second reference signals are determined through IC mask options.

31. The apparatus of claim 29 wherein the first and second reference signals are programmable.

32. An apparatus for trip point applications, comprising:
first comparing means for first comparing an input signal to a first selected signal and for controlling a state of a comparison signal responsive to the first comparison, the comparison signal having either a first or second state, the first selected signal being either a first or a second reference signal, the first reference signal being higher than the second reference signal;
second comparing means for second comparing the input signal to a second selected signal and for controlling the state of the comparison signal responsive to the second comparison, the second selected signal being either a third or a fourth reference signal, the third reference signal being higher than the fourth reference signal and the second reference signal being higher than the third reference signal, the comparison signal having the first state if the input signal is higher than the first selected signal or lower than the second selected signal and the comparison signal having the second state if the input signal is lower than the first selected signal and higher than the second selected signal;
an up/down counter selectively counting in a first direction if the comparison signal is the first state and selectively counting in a second direction if the comparison signal is the second state, the up/down counter having two counter outputs, providing two counter output signals therefrom; and
multiplexer means for selecting the first and fourth reference signals as the first and second selected signals in response to one of the counter output signals of the up/down counter and for selecting the second and third reference signals as the first and second selected signals in response to the other of the counter output signals of the up/down counter, whereby, by selecting between the reference signals, the apparatus filters with hysteresis; and
means for signaling an operator responsive to the counter outputs of the multiplexer means.

33. The apparatus of claim 32 wherein the first, second, third and fourth reference signals are determined through IC mask options.

34. The apparatus of claim 32 wherein the first, second, third and fourth reference signals are programmable.

35. An integrated circuit apparatus for processing a set of measurement signals responsive to a set of senders, comprising:
means for providing a set of reference signals, the set of reference signals comprising subsets of first and second reference signals, each subset corresponding to one of the measurement signals;
memory means for addressably storing information, including an address input and a data output, wherein each reference signal of the set of reference signals corresponds to one address of a set of addresses in the memory means;

counter means for selectively addressing the memory means, thereby selecting one of the subsets of reference signals;

a set of filter means for filtering data, each filter means corresponding to one measurement of the set of measurement signals and one subset of reference signals, comprising:

(i) means for addressing the memory means in response to a control signal to select the corresponding first or second reference signal;

(ii) means for comparing a corresponding measurement signal to the selected reference signal and for providing a comparison output signal therefrom;

(iii) means for filtering the comparison output signal, including an up/down counter having overflow and underflow outputs providing overflow and underflow output signals as a filtered response to the comparison output signal;

(iv) means for providing the control signal in response to the overflow and underflow output signals, the control signal comprising a first signal condition fi the corresponding output signal is below the selected reference signal for a predetermined number of clock pulses and the control signal comprising a second signal condition if the corresponding output signal is above the selected reference signal for a predetermined number of clock pulses;

wherein the counter means selectively activates each of the filter means so that only one filter means is activated at one time and the counter means selects the corresponding subset of first and second reference signals for each filter means, and wherein, the memory means is addressed in response to the control signal, thereby selecting the first or second reference signals.

36. The apparatus of claim 35 wherein the set of filter means comprises four filter means.

37. The apparatus of claim 35 wherein the set of filter means comprises at least one filter means, the set of measurement signals comprises at least one measurement signal, and the set of reference signals comprises at least one subset of first and second reference signals.

* * * * *